United States Patent [19]
Goldmann et al.

[11] Patent Number: 5,616,778
[45] Date of Patent: Apr. 1, 1997

[54] MODIFIED FORM OF BIS-1,4-[2'-(2",5"-DIMETHOXY-CARBONYL-PHENYLAZO)-3'-OXOBUTYRAMIDO]BENZENE AND PROCESS FOR ITS SYNTHESIS

[75] Inventors: Jürgen Goldmann, Münchenstein; Bansi L. Kaul, Biel-Benken, both of Switzerland

[73] Assignee: Sandoz Ltd., Basel, Switzerland

[21] Appl. No.: 230,990

[22] Filed: Apr. 21, 1994

Related U.S. Application Data

[63] Continuation of Ser. No. 948,371, Sep. 21, 1992, abandoned, which is a continuation of Ser. No. 631,570, Dec. 21, 1990, abandoned.

[30] Foreign Application Priority Data

Dec. 22, 1989 [DE] Germany ............................ 39 42 557.6

[51] Int. Cl.$^6$ .................................................. C07C 229/00
[52] U.S. Cl. ................................................................ 560/35
[58] Field of Search .................................................... 560/35

[56] References Cited

U.S. PATENT DOCUMENTS

| | | | |
|---|---|---|---|
| 3,112,303 | 11/1963 | Inman ........................ | 260/193 |
| 3,900,459 | 8/1975 | Kawamura et al. ...................... | 260/157 |
| 3,951,943 | 4/1976 | Towle ........................ | 260/176 |
| 3,997,521 | 12/1976 | Forter et al. ............................. | 260/176 |
| 4,003,886 | 1/1977 | Muller ........................ | 260/176 |
| 4,070,353 | 1/1978 | Cseh et al. ............................. | 260/176 |
| 4,222,788 | 9/1980 | Liedek et al. ............................. | 106/289 |
| 5,030,247 | 7/1991 | Goldmann ...................... | 8/639 |

FOREIGN PATENT DOCUMENTS

| | | |
|---|---|---|
| 759771 | 2/1971 | Belgium . |
| 1135688 | 11/1982 | Canada . |
| 2070241 | 9/1971 | France . |
| 2254625 | 5/1973 | Germany . |

OTHER PUBLICATIONS

McLaren et al., J. Soc. Dyers Colourists 1976, 338–339.
Colorimetry, 2nd ed., Central Bureau of the CIE, Vienna, Austria (1986), pp. 1 and 27–33.

Primary Examiner—Marianne M. Cintins
Assistant Examiner—Keith MacMillan
Attorney, Agent, or Firm—Robert S. Honor; Carl W. Battle; Hesna J. Pfeiffer

[57] ABSTRACT

The compound of the formula

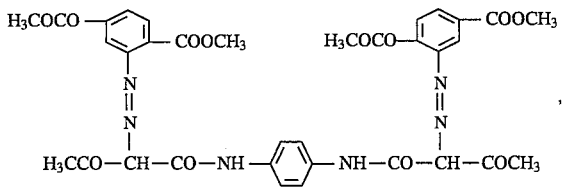

having the following CIELAB values:
L*=82.55
a*=11.53
b*=90.49
C*=91.22 and
H*=82.74.

2 Claims, No Drawings

MODIFIED FORM OF BIS-1,4-[2'-(2",5"-DIMETHOXYCARBONYLPHENYLAZO)-3'-OXOBUTYRAMIDO]BENZENE AND PROCESS FOR ITS SYNTHESIS

This is a continuation of application Ser. No. 07/948,371, filed Sep. 21, 1992 and now abandoned, which is a continuation of application Ser. No. 07/631,570, filed Dec. 21, 1990 and now abandoned.

The invention relates to a modified azo pigment and a new process for its production.

The compound of formula I defined below is described in Example 20 of U.S. Pat. No. 3,997,521 and has been found to have the CIELAB values as follows:

$L^*=79.51$
$a^*=15.18$
$b^*=86.77$
$C^*=88.09$
$H^*=80.08$

The CIELAB values were determined with 25.3% by weight of the pigment according to Example 20 of U.S. Pat. No. 3,997,521 in an alkyd-melamine-formaldehyde resin coating.

The alkyd-melamine-formaldehyde (AMF) resin coating was made up as follows (all parts are by weight):

15 parts of pigment are dispersed with 10 parts of a colorless dispersing agent (Disperbyk 160), 67.78 parts of alkyd-melamine-formaldehyde lacquer, 6.79 parts of xylene and 180 parts of glass pearls (3 mm in size) were ground over 3 hours in a "Red Devil" (a milling process). This is applied preferably with a doctor blade onto white carton paper to a thickness of 0.15 mm and hardened at 120° C. for 30 minutes.

The AMF resin comprises:
18.5 parts of xylene
1.44 parts of butyl glycol acetate
10.00 parts of melamine-formaldehyde resin "Maprenol 650" in 8.20 parts of isobutanol
20.00 parts of coco alkyd resin "Alphtalat AC 451N" in 8.56 parts of "Solvesso 100" (a mixture of aromatic solvents having a boiling point range of 162° C. to 177° C.).
20.00 parts of coco alkyd "Alphtalat AC 451M" dissolved in 13.30 parts of a 50:50 mixture of xylene and Solvesso 150 (a mixture of aromatic solvents having a boiling point range of 187°–211° C.).

However, it has been found to have dispersibility properties that are not optimum and to have a nuance that is also not optimum. These problems are alleviated by preparing a modified pigment according to the invention.

According to the invention there is provided a modified compound of formula I

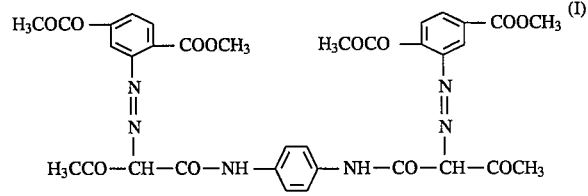

having the following CIELAB values:
$L^*=82.55$
$a^*=11.53$
$b^*=90.49$
$C^*=91.22$ and
$H^*=82.74$.

The CIELAB values are as defined in J. Soc. Dyers and Colourists Sep. 1976 p. 337 et seq., especially pages 337 and 338.

The CIELAB values were determined with 25.3% by weight of the pigment according to the invention in the above mentioned alkyd-melamine-formaldehyde resin coating.

The CIELAB values given are +/−1%, more preferably +/−0.5%.

Further according to the invention there is provided a process for preparing the compound of formula I

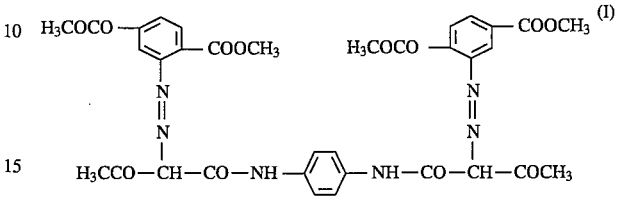

characterized by
a) dissolving 1,4-bis-(acetoacetylamino)benzene in an aqueous alkaline hydroxide solution,
b) precipitating 1,4-bis(acetoacetylamino)benzene to form a suspension, preferably by bringing the pH of the solution to pH 6.5 to 7.5, and
c) then coupling the product of Step b) with a solution of diazotized 2-aminoterephthalic acid dimethyl ester, the molar ratio of diazotized 2-aminoterephthalic acid dimethyl ester to 1,4-bis-(acetoacetylamino)benzene being about 2:1 (preferably 2:1).

Preferably, in Step b) of the process of the invention, the pH is brought to 6.5 to 7.5 by the addition of at least one organic and/or inorganic acid, for example glacial acetic acid and/or hydrochloric acid.

The resulting pigment of formula I may be isolated by, for example, filtration, washed salt-free with water, dried and treated with a higher boiling point organic solvent and then isolated by conventional methods, for example by filtration.

Preferably, in the process of the invention, the pigment of formula I, after reaction, is filtered, washed salt-free with water, dried, treated with an organic solvent (preferably a high boiling organic solvent, more preferably one having a boiling point of at least 150° C., especially dimethylformamide) for a period of up to 6 hours, preferably 1 to 5 hours, at 80 to 150° C. and filtered. After the product has been filtered, washed salt-free, dried, treated in an organic solvent and filtered, it may be further treated by washing (with, for example, a low boiling point alcohol, i.e., one having a boiling point less than 100° C. such as methanol or ethanol), drying and grinding (or crushing) to form the desired smaller particles.

The pigment of formula I made according to the process of the invention can be applied to polymeric material and has better purity of nuance, has a greener nuance, is more stable to light, has a better stability to heat (especially in polypropylene) and is more easily dispersed in polyolefins than that made according to Example 20 of U.S. Pat. No. 3,997,521.

Preferred polymeric materials include solvent-containing and solvent-free plastics, e.g., polyolefins, polyvinylchloride (PVC), polystyrene, acrylic, polyester, alkyd and polyurethane lacquers. Preferred polymeric materials and methods for applying the pigment to the material are as described in U.S. Pat. No. 3,997,521, which is incorporated herein by reference.

The invention will be illustrated by the following example in which all parts and percentages are by weight and all temperatures are in degrees C.

EXAMPLE a) 104.5 parts of the dimethyl ester of 2-aminoterephthalic acid are stirred into a mixture of 70 parts water, 111.5 parts of glacial acetic acid, 150 parts of 30% hydrochloric acid solution and 0.3 parts of the sodium salt of dinaphthyl-methanedisulphonic acid.

This mixture is stirred for 4 hours. 100 parts of ice are added to the suspension, and the mixture is put in an ice bath to cool it to 0°.

35.2 parts of sodium nitrite (in the form of 150 parts of an aqueous solution) are then added over 1 hour while keeping the temperature between 0° and 5° with the addition of ice, whereby the suspension changes into a clear yellow-brown solution. The excess nitrite is destroyed by using aminosulphonic acid solution. To purify the solution, 5 parts of a commercially available filter earth are added, the mixture is stirred, the filter earth is filtered off and the residue is washed with a little water.

b) 93.1 parts of 30% NaOH solution is added to 500 parts water at 10°.

69.0 parts of 1,4-bis-(acetoacetylamino)benzene are added, and the mixture is stirred for 30 minutes after which 5.0 parts of a commercially available filter earth are added. The mixture is then stirred again, the solution is filtered, and the filter earth is washed with a little water. Over the course of 30 minutes, a solution of 400 parts of water, 400 parts of ice, 73.5 parts glacial acetic acid and then 53.2 parts of 30% NaOH solution is added while stirring.

c) The diazonium salt solution of part a) above is run into the suspension of part b) above over 2 hours. The reaction mixture is then stirred for a further 2 hours with a slight increase in temperature, stirred for 1 hour at 40° to 45° C., stirred for a further hour at 65° C. and finally stirred for a further hour at 80° C. The resulting yellow precipitate is filtered, washed with cold water to remove any salt and dried conventionally under vacuum (the remaining amount of water is less than 1%).

d) 71.6 parts of the resulting pigment is stirred with 570 parts of dimethylformamide for 2 hours at 150°, the mixture is cooled to 80 to 100° C. and filtered, and the obtained solid is washed with a low boiling point alcohol (i.e., one having a boiling point of less than 100° C., especially methanol or ethanol), dried and ground.

The filter earth used is "Hyflo", a filtering earth from Mexico.

The resulting pigment is of formula I and in a lacquer, as given above, has the following CIELAB values:
L*=82.55
a*=11.53
b*=90.49
C*=91.22 and
H*=82.74.

The colorimetric differences between the compound of this invention and the compound made according to Example 20 of U.S. Pat. No. 3,997,521 are as follows:
DL*=3.04
Da*=−3.65
Db*=3.72
DC*=3.13
DH*=4.16 and
DE*=6.03. (DE* is the total difference in the color change.)

The pigment has improved properties and can be used to color solvent-containing and solvent-free plastics material and plastic resins a green-yellow tone. The resultant fastness properties are very good.

What is claimed is:

1. The compound of the formula

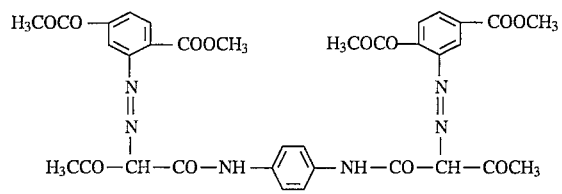

having the following CIELAB values:
L*=82.55,
a*=11.53,
b*=90.49,
C*=91.22 and
H*=82.74,
said CIELAB values being measured when the compound is incorporated into an alkydmelamine-formaldehyde resin coating in an amount of 25.3% by weight, which is prepared by the process comprising:

a) dissolving 1,4-bis-(acetoacetylamino)benzene in an aqueous alkaline hydroxide solution;

b) precipitating 1,4-bis(acetoacetylamino)benzene to form an aqueous suspension by brining the pH of said solution to 6.5–7.5; and c) coupling the product of step b) with an aqueous solution of diazotized 2-aminoterephthalic acid dimethyl ester, the molar ratio of diazotized 2-aminoterephthalic acid dimethyl ester to 1,4-bis(acetoacetylamino)-benzene being about 2:1; and d) filtering and washing salt-free the product of step c), with water, then drying and treating with a high boiling organic solvent for a period of up to six hours at 80° to 150° C. and filtering; and e) washing the product of step d) with a low boiling alcohol, and drying.

2. The compound of the formula

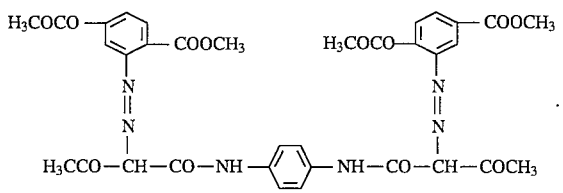

having the following CIELAB values:
L*=82.55,
a*=11.53,
b*=90.49,
C*=91.22 and
H*=82,74,
said CIELAB values being measured when the compound is incorporated into an alkydmelamine-formaldehyde resin coating in an amount of 25.3% by weight.

* * * * *